United States Patent [19]

Godwin, Jr. et al.

[11] 4,413,177

[45] Nov. 1, 1983

[54] OPTICAL SCANNING APPARATUS INCORPORATING COUNTER-ROTATION OF PRIMARY AND SECONDARY SCANNING ELEMENTS ABOUT A COMMON AXIS BY A COMMON DRIVING SOURCE

[75] Inventors: Paul K. Godwin, Jr., Farmington, Mich.; Ronald T. Honda, Irvine, Calif.

[73] Assignees: Ford Motor Company, Dearborn; Ford Aerospace & Communications Corp., Detroit, both of Mich.

[21] Appl. No.: 325,953

[22] Filed: Nov. 30, 1981

[51] Int. Cl.³ .............................................. G01J 1/20
[52] U.S. Cl. ............................... 250/203 R; 250/236; 350/6.9
[58] Field of Search ................... 250/203 R, 234, 235, 250/236; 244/3.16; 350/6.9, 6.91

[56] References Cited

U.S. PATENT DOCUMENTS

| | | | |
|---|---|---|---|
| 4,009,393 | 2/1977 | Ashley, Jr. et al. | 250/339 |
| 4,010,365 | 3/1977 | Meyers et al. | 250/236 |
| 4,030,807 | 6/1977 | Briney | 350/7 |
| 4,039,246 | 8/1977 | Voigt | 350/7 |

*Primary Examiner*—David C. Nelms
*Attorney, Agent, or Firm*—Paul K. Godwin, Jr.; Robert D. Sanborn

[57] ABSTRACT

An optical scanning apparatus embodied in a gyroscopic missile seeker to provide a rosette scan pattern of the field of view. A single driving motor is employed with a traction drive assembly to produce the necessary counter-rotation of slightly canted scanning elements and thereby effect the rosette scan pattern. A canted primary focusing mirror is directly driven by the motor and is connected through a traction drive to a canted secondary mirror to effect proportional counter-rotation of the secondary mirror.

9 Claims, 1 Drawing Figure

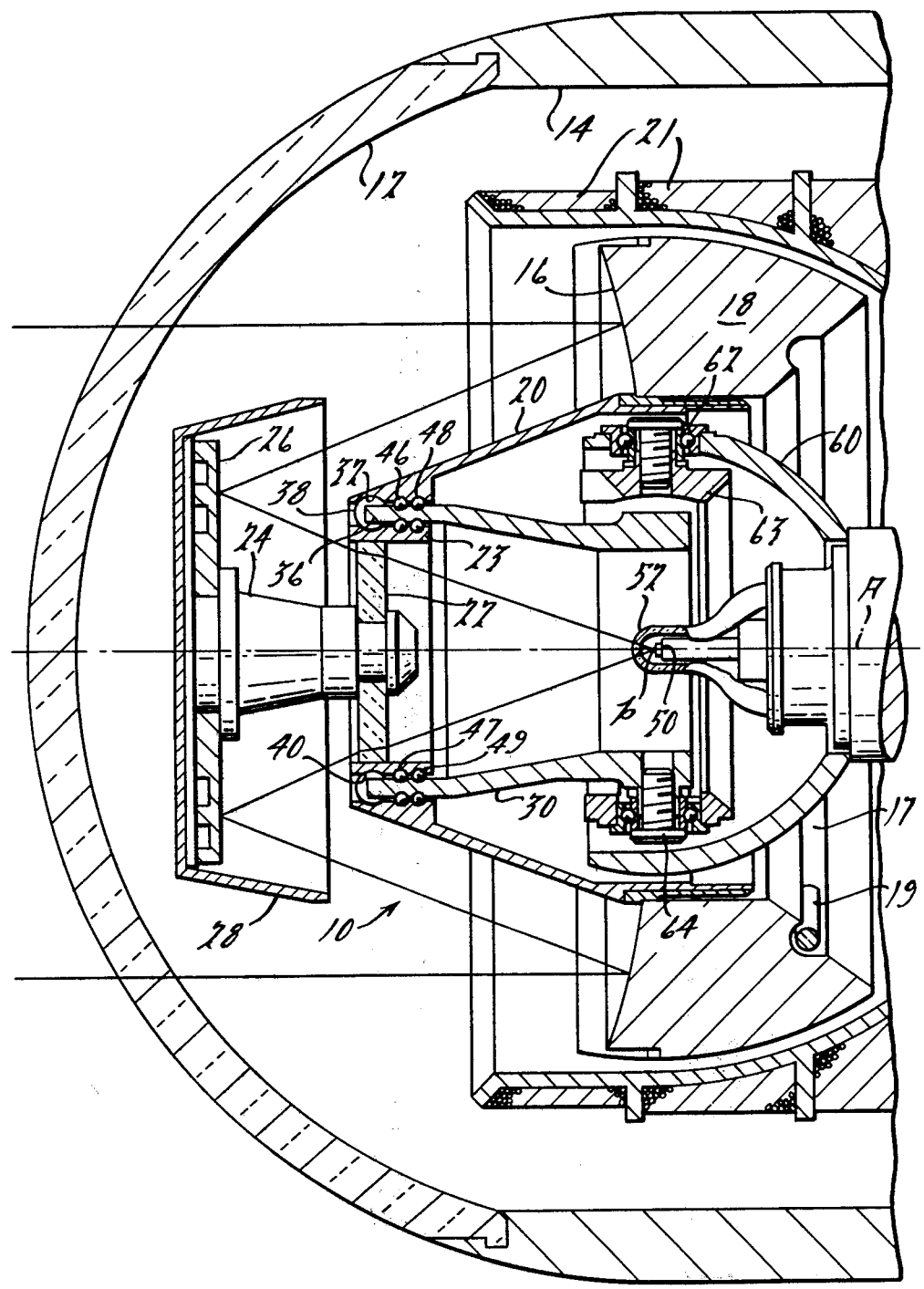

OPTICAL SCANNING APPARATUS INCORPORATING COUNTER-ROTATION OF PRIMARY AND SECONDARY SCANNING ELEMENTS ABOUT A COMMON AXIS BY A COMMON DRIVING SOURCE

REFERENCE TO RELATED APPLICATION

The present invention is related to U.S. Ser. No. 319,010, filed on Nov. 6, 1981, by Ronald T. Honda and Michael E. Buchtel.

BACKGROUND OF THE INVENTION

1. Field of the Invention

The present invention is directed to the field of optical scanning and more specifically to the area of gyroscopically mounted missile seeker assemblies and other optical telescope applications.

2. Description of the Prior Art

In the last several years, it has been found that the most efficient data collection pattern for scanning a field of view with a gyro-stabilized target seeker in a missile is the "rosette" scan pattern. The "rosette" scan pattern and prior art assemblies are discussed in U.S. Pat. Nos. 4,009,393; 4,030,807; and 4,039,246, the texts of which are incorporated herein by reference. In each of the aforementioned patents, the "rosette" scan pattern is achieved in a cassegrain type telescope configuration by effecting counter-rotation of two separate, slightly canted, scanning elements by employing a separate rotational drive motor for each scanning element.

Although the prior art attempts described above appear to give a sound theoretical approach to achieving the "rosette" scan pattern, the actual construction of such devices has been found to present critical imbalance problems and phase instability. Other problems occur in attempting to incorporate the number of drive motors specified in the prior art patents into the severely limited space provided in missile environments.

SUMMARY OF THE INVENTION

The present invention is intended to overcome the problems of the prior art by providing an optical scanning apparatus which achieves a "rosette" scan pattern of images over the field of view and by utilizing a single driving means to achieve counter-rotation of a plurality of scan elements within the apparatus.

An embodiment of the invention is shown installed on a gyro-stabilized target seeker of the type commonly employed in missile applications. The gyro-optics assembly of the present invention consists of a gimbal mounted cassegrain telescope with a slightly canted aspheric primary mirror which produces a primary conical scan of the field of view that is relayed to a focal plane near the center of the gyro. The telescope also includes a slightly canted secondary mirror in the optical path that produces a second conical scan of the image over the field of view in a rotational direction that is opposite to that of the canted primary mirror rotation. The vector sum, of the two scans acting in concert, produces the "rosette" scan pattern of the field of view and the scanned images are focused onto a detector located at the focal plane.

The secondary scanning mirror is mechanically linked to the primary scanning mirror of the gyro-optical system through a traction drive assembly. The traction drive assembly is composed of a planetary bearing system which includes a spin bearing and a traction gear drive of the secondary scan mechanism.

The primary and secondary mirrors are caused to counter-rotate about the gyroscopic spin axis by a relatively fixed motor means in the form of drive coils energized to interact with a magnetic gyro mass. The magnetic gyro mass is formed to also function as a support for the primary mirror surface. The rotation of the primary mirror is directly communicated through the traction drive mechanism to the secondary mirror and thereby synchronously rotates the secondary mirror at a speed which is continuously proportional to the speed and opposite to the direction of the primary mirror rotation.

It is, therefore, an object of the present invention to provide an optical scan apparatus which achieves the desired "rosette" scan pattern of a field of view through counter-rotation of separate scan elements with a common driving source.

It is another object of the present invention to provide a scanning apparatus in which the secondary scan mechanism is mechanically linked to the primary scan mechanism to assure absolute phase synchronization.

It is a further object of the present invention to provide an optical scanning apparatus in which a canted primary mirror and a canted secondary mirror are caused to rotate in opposite directions with a single drive motor.

BRIEF DESCRIPTION OF THE DRAWING

The figure is a 90° cross-sectional view of an optical seeker employing the present invention.

DETAILED DESCRIPTION OF THE EMBODIMENT

The present invention is shown in a gimbal mounted cassegrain type telescope 10 within a missile housing 14 behind a transparent dome 12. Electromagnetic energy within the field of view, as defined by a concave primary mirror 16, is transmitted through the dome 12 and then reflected and converged forward to a secondary mirror 26 towards the spin axis A. The energy reflected by the secondary mirror 26 is directed through a support lens 22 to a focal point p coincident with the location of a detector 50, at the gyroscopic center point of the assembly.

The concave primary mirror 16 is formed on the forward looking surface of a permanent magnet gyro mass 18 that is mounted for gyroscopic rotation about the spin axis A, which is shown as being approximately coincident with the optical axis defined by the primary mirror 16. Drive coils 21 are fixedly located so as to enclose the gyro mass 18 and are energized to generate the required magnetic flux that in turn causes the gyro mass 18 to be rotated at a predetermined rate. A groove 17 is located in the rearward portion of the gyro mass 18 in order to provide a location for the insertion of stabilizing balancing weights 19.

The gyro mass 18 and the primary mirror 16 are mounted on a support housing 20 that is connected to a gimballed support 30 through outer spin bearing sets 46 and 48. The support lens 22 has its outer edges connected to a mounting ring 23 which is in turn connected to the gimballed support 30 through inner spin bearing sets 47 and 49. A central aperture in support lens 22 receives a mounting pedestal 24; and the opposite end of the pedestal 24 is connected to a base/shroud 28. The circular secondary mirror 26 is mounted to the base/- shroud 28. Although it is difficult to discern from the drawings, the primary mirror 16 is canted approximately 1° from the perpendicular to the spin axis and the secondary mirror 26 is canted approximately 2°.

The support housing 20 is coupled to the mounting ring 23 through a traction drive mechanism to thereby produce fixed phase counter-rotation of the two scanning mirrors. Traction drive is achieved by a plurality of balls 38 which function as planetary gears held in a relatively fixed spacial relationship by a cage 36 formed at the outer end of gimballed support 30. The balls 38 are disposed about a groove 40 that provides an inner race sun gear on the outer surface of mounting ring 23. A groove 32, formed on the inner surface of the support housing 20, provides the outer race ring gear of the traction drive mechanism.

The gimballed support 30 is mounted for pivotal movement about the focal point p by a pair of inner gimbal pivots 64. The inner gimbal pivots 64 (only one is shown) interconnect the support 30 to an outer gimbal ring 63. The outer gimbal ring 63 is in turn gimbal supported through a second pair of gimbal pivots 62 (only one is shown) to a relatively fixed support housing 60. The relatively fixed support housing 60 is attached to the body of the missile 14 through various conventional elements that are not shown.

A Dewar flask 52 is provided with a transparent portion for receiving the focused image from support lens 22 and for providing a cryogenic atmosphere to the detector 50 at the gyroscopic center point p. The detector 50 provides an output signal to a conventional electronic amplifier (not shown), in response to the amount of energy instaneously received throughout the scan pattern.

In operation, when power is applied to the drive coils 21 to cause spinning of the gyro-mass 18 as well as the canted primary mirror 16, the outer race 32 contacts the outer surfaces of the balls 38 causing them to rotate in place, due to the relatively fixed retaining cage 36. The rotating balls 38 cause counter-rotation of the secondary mirror 26 at a rate that is proportional to the radial dimension of the inner race 40 contact point to that of the outer race 32 contact point with the balls 38. The counter-rotation of the primary mirror 16 and the secondary mirror 26 at proportional spin rates about the spin axis A creates the rosette scan pattern of images, over the field of view.

Of course, it is expected that many modifications and variations will be apparent to those skilled in the art. For instance, since the present invention is shown in an embodiment for receiving energy from a remote source, the invention is envisioned as also being well suited for scanning devices which project energy towards a distant target from a source imaged, for instance, at the point p. Accordingly, it is intended by the appended claims to cover all such modifications and variations which fall within the true spirit and scope of the invention.

We claim:

1. An optical scanning apparatus including:
    means providing a concave primary mirror disposed to focus an image within the field of view of said primary mirror at a central optical axis;
    detector means disposed at a defined focal point on said optical axis for receiving said focused image and responsively outputting an electrical signal;
    means providing a secondary mirror displaced from said primary mirror on said optical axis to direct said focused image towards said detector means;
    means for rotating said primary mirror at a first rate and direction about a defined spin axis;
    means connected to said primary mirror providing means for responsively rotating said secondary mirror about said spin axis at a rate that is directly proportional to said first rate and in a direction that is opposite to the rotation of said rotational direction of said primary mirror.

2. A scanning apparatus as in claim 1, wherein said primary mirror and said secondary mirror are each slightly canted with respect to the perpendicular to said spin axis and provide a rosette scan pattern of images within said field of view to said detector means.

3. An optical scanning apparatus as in claim 2 wherein said primary and secondary mirror providing means, are gimbal mounted to move about a central point at which said detector means is located and maintain the focus of said image at said detector means.

4. An apparatus as in claim 3, rotating means includes a traction drive mechanism to communicate counter-rotational forces from said rotating primary mirror to said secondary mirror, causing rotation of said secondary mirror in a direction opposite to the rotational direction of said primary mirror.

5. An optical scanning apparatus for providing a rosette scan pattern of focused images over the field of view of said apparatus, including:
    a focused primary mirror means for defining said field of view and for conically scanning said defined field of view at a first rate and direction of rotation;
    secondary mirror means in said optical path adjacent said primary mirror means for conically scanning said defined field of view at a second rate of rotation that is directly proportional to said first rate and in a rotational direction opposite to said first direction of rotation; and
    a single motor means for producing the rotation of said primary mirror means and the counter-rotation of said secondary mirror means.

6. An optical scanning apparatus as in claim 5, wherein said motor means functions to rotate said primary mirror means at said first rate and includes a traction drive means between said primary mirror means and said secondary mirror means to responsively rotate said secondary mirror means in said opposite direction.

7. An optical scanning apparatus as in claim 6, wherein said primary mirror means and secondary mirror means are gimbal mounted.

8. An optical scanning apparatus for scanning a rosette pattern over a defined field of view, including:
    an aspheric primary mirror mounted for rotational scanning of a first scan pattern over said field of view;
    a secondary mirror mounted for rotation in a slightly canted relationship with respect its axis of rotation and disposed in an optical path defined with respect to said primary mirror;
    means for rotating said primary mirror in a first direction and rate; and
    means interconnecting said primary mirror and said secondary mirror for driving said secondary mirror in a counter-rotational direction with respect to said first direction at a rate directly proportional to that of said primary mirror.

9. An optical scanning apparatus as in claim 8, wherein said secondary mirror driving means comprises a traction drive mechanism between said primary and secondary mirrors.

* * * * *